S-M-S DEVICE WITH PARTIAL SEMICONDUCTING LAYERS

Filed Sept. 15, 1964

INVENTORS:
Richard R. Garnache &
Ferdinand Lincoln Vogel, Jr.

BY Connolly and Hutz
ATTORNEYS

United States Patent Office 3,375,418
Patented Mar. 26, 1968

3,375,418

S-M-S DEVICE WITH PARTIAL SEMICONDUCTING LAYERS

Richard R. Garnache, Clarksburg, and Ferdinand Lincoln Vogel, Jr., Williamstown, Mass., assignors to Sprague Electric Company, North Adams, Mass., a corporation of Massachusetts Filed Sept. 15, 1964, Ser. No. 396,694
6 Claims. (Cl. 317—235)

ABSTRACT OF THE DISCLOSURE

A device having a thin metallic layer between composite layers, each of which contains a non-crystalline semiconductive material and a non-conductive material or polycrystalline material.

This invention relates to a semiconductive device having a thin metallic layer between two layers of monocrystalline semiconductor material (hereinafter identified as an S-M-S device), and more particularly to a method for the application of a contact to the metallic layer of an S-M-S transistor involving the epitaxial growth of a second layer of monocrystalline semiconductor material on a first layer.

An S-M-S device has electrodes applied to the two semiconductor layers and an ohmic contact to the metallic layer. In one form of this type of device the metallic layer has a thickness of no more than about 300 angstrom units. The maximum thickness is restricted to the mean free path of a charge carrier transversing the metallic layer between the semiconductor layers.

The electrical contact that must be attached to the metallic layer must be adequate to produce the necessary bias at the metallic layer to cause it to function as a base or gate in the completed S-M-S device. As the metallic layer is no greater than about 300 angstrom units thick, there is little area for contact in the dimension of the layer normal to its broad surface. Moreover, being sandwiched between the semiconductor layers, this lateral surface normal to the major dimension of the metallic layer is the only surface readily accessible to electrical contact.

A major feature of S-M-S devices is smallness which in turn permits miniaturization of resultant integrated devices. Accordingly it is of paramount importance to effect an electrical contact to an element of an S-M-S device without increasing the overall dimension of the device including the electrical connection, whereby the usefulness of S-M-S devices in electrical circuitry having a high density of electrical components can be preserved.

It is an object of this invention to provide a monocrystalline S-M-S device with an improved electrical connection to the metallic layer.

It is another object of this invention to provide a monocrystalline S-M-S device having an electrical connection to the metallic layer which does not increase the overall size of the device.

It is a further object of this invention to provide a monocrystalline S-M-S transistor in which the contact to the very thin metallic layer is applied on the surface along the major dimension of the layer.

These and other objects of this invention will become more apparent on consideration of the following description taken together with the accompanying drawing in which.

Figure 1:
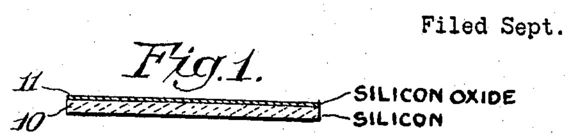
FIGURE 1 is a sectional view of a monocrystalline silicon body having a silicon oxide coating on a plane surface.
Figure 2:
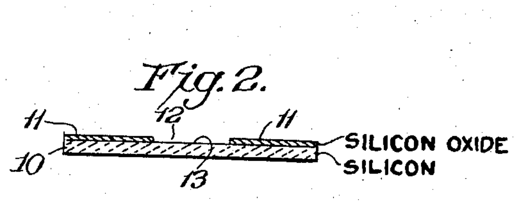
FIGURE 2 is a sectional view of the body of FIGURE 1 with a hole cut in the silicon oxide coat.

In general this invention provides an S-M-S transistor having an electrical connection to a plane surface of the metallic layer while not increasing the overall dimension of the device by utilizing the substantial difficulty with which epitaxial growth of semiconductor material takes place on amorphous or polycrystalline surfaces in contrast to the growth on monocrystalline surfaces.

More particularly in one aspect this invention provides an electrical connection on the plane surface of the metallic layer made with a reduced number of steps by applying a layer of silicon over the metallic layer, opening an aperture in the silicon over the metallic layer, and making an electrical connection through the aperture to the metallic layer.

The initial steps in the preparation of the S-M-S device of this invention involve producing monocrystalline silicon in an aperture in a silicon dioxide coating on a conductive base. A metal layer is grown over the silicon dioxide and the monocrystalline silicon is deposited in such a manner as to insure epitaxial growth of the metal layer in the area lying directly over the monocrystalline silicon in the aperture. These initial steps thus produce an intermediate structure in which the metal layer has the monocrystalline nature of the silicon.

The monocrystalline silicon has a desired concentration of impurities so as to be a semiconductor material. This can be obtained by preparing a solution capable of forming a vapor containing silicon and the impurity with the desired concentration. Gaseous hydrogen may be blown through the solution in order to take the vapor to the place of the production of the monocrystalline silicon semiconductor. For example, N-type layers of monocrystalline semiconductor material or P-type layers of monocrystalline semiconductor material may be developed by suitable selection of impurities.

In a preferred aspect of this invention a silicon dioxide layer is then applied over the metal layer, an aperture is opened in the silicon dioxide mask coinciding with the monocrystalline area of the metal layer and the first monocrystalline silicon layer, and then a second monocrystalline silicon layer is grown in the aperture. A hole is opened in the silicon dioxide mask extending to the metal layer and a metal contact is attached to the metal layer through this hole. Suitable ohmic contacts are attached to the two monocrystalline silicon layers to complete the S-M-S transistor.

A significant aspect of this invention is the identity of the crystal orientation of the two grown monocrystalline semi-conductor layers. They have the same crystal orientation and this identity of crystal orientation is limited to the areas indicated as monocrystalline and illustrated in the figures. As seen in the accompanying figures, this is the central portion of the structure of the illustrated embodiments. It will be understood that these monocrystalline sections define the active device. At the same time the remaining sections of the illustrated structures are integral with and necessary for a complete S-M-S unit.

The first monocrystalline layer and the second monocrystalline layer are either P-type or N-type conductivity semi-conductors, but both regions are the same conductivity type. When the layers are of P-type conductivity, the device operates with hole carriers and when they are of N-type conductivity, the device operates with electron carriers.

Figure 3:
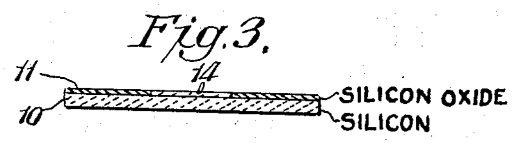
FIGURE 3 is a sectional view of the body of FIGURE 2 with a layer of monocrystalline silicon epitaxial grown in the hole in the coating.

Referring to the embodiments illustrated in the figures, FIGURE 1 shows a conductive base 10 on which a suitable insulating and masking coating 11 is placed. For the purpose of this description the base 10 may be considered as composed of monocrystalline silicon, and the coating 11 of silicon dioxide produced for example by thermal oxidation of the silicon base in steam. The coating 11 is partially removed by a suitable photoresist etching technique that is now conventional to the planar transistor art so as to produce a hole or window 12 in the coating 11, thereby laying bare a surface 13 of the body 10. The window 12 is then filled with a very thin layer 14 of monocrystalline silicon which is epitaxially grown on the surface 13 by a suitable procedure, such as the reduction of silicon tetrachloride in hydrogen at a temperature of 1200° C. At this temperature the silicon layer 14 grows readily on the exposed monocrystalline silicon 10, but not on the amorphous $SiO_2$ layer 11. Higher temperatures are avoided to ensure against silicon 14 punching through $SiO_2$ 11 to base 10. The application of monocrystalline layer 14 is illustrated in FIGURE 3 which shows the layer 14 of substantially the same thickness as the coating 11. The monocrystalline layer is prepared either as an N-type film or a P-type film as it is possible to prepare films having either N-type or P-type impurities as described on page 285 of Microelectronics by Edward Keonjian, McGraw-Hill, 1963.

The next step consists of forming a metallic layer 15 across the common plane surface of the coating 11 and the layer 14. This metallic material may be laid down by the reduction of a gaseous metal salt. For example, the reduction of gaseous molybdenum pentachloride at about 750° C. to about 1100° C. will lay down a molybdenum disilicide layer 15 which displays a metallic conductivity. For the purpose of a device of this invention this layer may be about 200 angstroms thick. It is desirable that the thickness of this metallic layer 15 be of the order of less than the mean free path of a charge carrier transversing the layer 15 in the operation of a transistor of this structure. Metallic layer 15 grows as single crystal over monocrystalline silicon layer 14 and polycrystalline over the amorphous $SiO_2$ layer 11.

Figure 4:
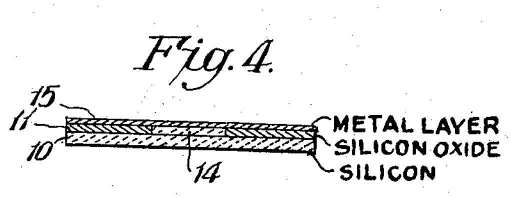
FIGURE 4 is a sectional view of the body of FIGURE 3 with a metallic layer deposited on the surface.
Figure 5:
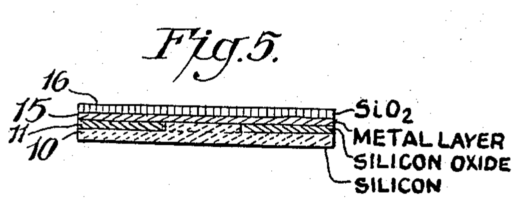
FIGURE 5 is a sectional view of the combined parts of FIGURE 4 with a silicon dioxide mask over the metal layer.
Figure 6:
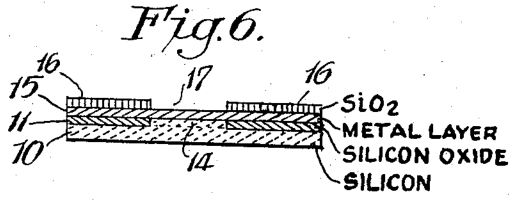
FIGURE 6 is a sectional view of the combination of parts of FIGURE 5 with an aperture in the silicon dioxide mask.

The intermediate structure illustrated in FIGURE 4 is made up of the monocrystalline silicon layer 14 and the apertured insulating coating 11 surrounding layer 14. The layer 14 and the coating 11 underlie metallic layer 15, with conductive base 10 supporting all these parts.

In one aspect of this invention, the S-M-S device of this invention is produced by applying to the intermediate structure of FIGURE 4 a mask 16, such as silicon dioxide, to cover the exposed surface of the metallic layer 15. This mask 16 then has a hole 17 formed in it by use of the suitable photoresist etching techniques mentioned above. The hole 17 coincides with and is lined up with the layer 14. A second monocrystalline silicon layer 18 is then epitaxially grown in the aperture 17.

To complete the device an opening 19 is produced in a portion of the silicon dioxide mask 16 by the photoresist etching technique mentioned above. This opening 19 extends to but does not extend into the metallic layer 15. A small electrical contact 20 is attached on the metallic layer 15 in ohmic contact therewith. Suitable ohmic contacts 21 and 22 are attached to the monocrystalline layer 18 and the conductive support 10, respectively.

Figure 9:
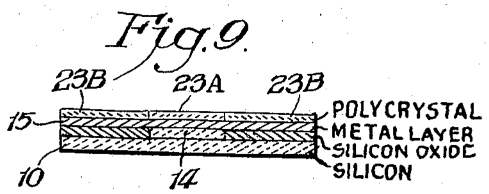
FIGURE 9 is a sectional view of the combination of parts of FIGURE 4 with a layer of silicon grown over the metal layer.
Figure 7:
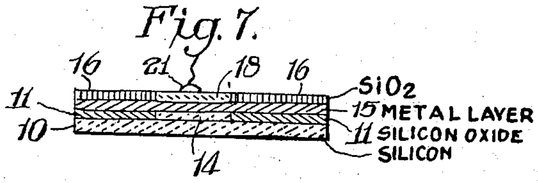
FIGURE 7 is a sectional view of the combination of parts of FIGURE 6 with a layer of monocrystalline silicon grown in the aperture in the mask.
Figure 10:
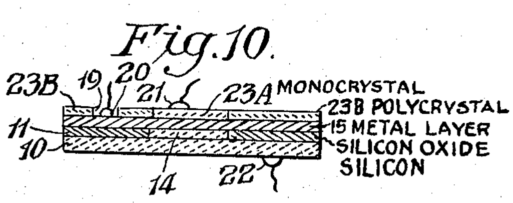
FIGURE 10 is a sectional view of the combination of parts of FIGURE 9 with an electrical connection applied on a plane surface of the major dimension of the metal layer.
Figure 8:
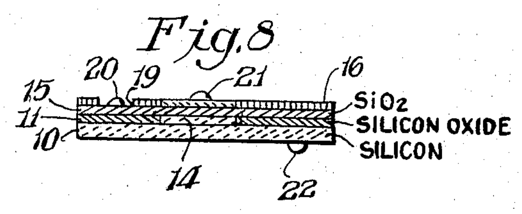
FIGURE 8 is a sectional view of the combination of parts of FIGURE 7 with an electrical connection attached to the metal layer on a plane surface of its major dimension.

In the modification illustrated in FIGURES 9 and 10 a layer 23 of silicon is deposited on the plane surface of the metallic layer 15 of the intermediate structure of FIGURE 4 as by the silicon tetrachloride in hydrogen procedure described above. It has been discovered that this deposition on the metallic layer 15, which in turn overlies both the silicon dioxide coating 11 and the first monocrystalline layer 14, will result in epitaxial growth of a layer of monocrystalline semiconductor silicon on top of the metallic layer 15 over the layer 14 accompanied by the simultaneous deposition of a very thin layer of polycrystalline silicon on the metallic layer 15 over the areas of the silicon dioxide coating 11.

Thus the layer 23 has a monocrystalline section 23A and a polycrystalline section 23B. A contact to the metallic layer 15 is effected by opening the hole 19 through the polycrystalline section 23B and applying the contact 20. The transistor device is completed by the attachment of ohmic contacts 21 and 22.

While the above description contains illustrations of the invention and refers to methods for providing the desired arrangement of parts it will be understood that further modifications are possible. For example, by utilizing minimal nucleating conditions silicon layer 23 will deposit only over the single crystal metallic portion of layer 15 and not over the polycrystalline portions of layer 15 which formed over the $SiO_2$ coating 11.

As the various embodiments are set forth for purpose of illustration only it will be understood that the scope of this invention is limited only by the appended claims.

What is claimed is:

1. A method for making a semiconductor device including the growth of alternate layers of monocrystalline semiconductor material of the same conductivity type and a very thin layer of metallic material wherein said metallic material exhibits metallic conduction including the steps of forming a non-conducting coating upon a surface of a monocrystalline semiconductor material base so as to partially cover said surface, epitaxially growing a first layer of monocrystalline semiconductor material of one conductivity type on the uncovered portion of the surface of said monocrystalline semiconductor base, applying a layer of metallic material on the surface of the non-conducting coating and the juxtaposed semiconductor layer whereby said layer exhibits metallic conduction, applying a protective layer over part of the metallic layer, and epitaxially growing on said metal layer a second monocrystalline semiconductor layer of the same conductivity type as said first layer, and forming an opening through said protective layer and attaching an ohmic contact to said metallic layer through said opening.

2. A method for making a semiconductor device including the growth of alternate layers of monocrystalline silicon of the same conductivity type and a very thin layer of metallic material wherein said metallic material exhibits metallic conduction including the steps of forming a nonconducting mask coating upon a surface of a monocrystalline silicon base so as to partially cover said surface, epitaxially growing a first layer of monocrystalline silicon having one conductivity type on the uncovered portion of the surface of said monocrystalline silicon base, applying a layer of metallic material on the surface of the mask and the juxtaposed semiconductor layer whereby said layer exhibits metallic conduction, applying a protective layer over the metallic layer and epitaxially growing on said metal layer of the same conductivity type as said first layer a second monocrystalline silicon layer, forming an opening through said protective layer, and attaching an ohmic contact to said metallic layer through said opening.

3. A method for making a semiconductor device including the growth of alternate layers of monocrystalline silicon of the same conductivity type having the same crystal orientation and a very thin layer of metallic material wherein said metallic material exhibits metallic conduction including the steps of forming a silicon dioxide coating upon a surface of a monocrystalline silicon base so as to partially cover a surface of said base, epitaxially growing a first layer of monocrystalline silicon having one conducting type along side of the silicon dioxide coating on the uncovered portion of said base surface, said first layer having the same crystal orientation as said base, applying a layer of metallic material over the surface of the coating and silicon layer whereby said metallic layer exhibits metallic conduction, applying a silicon layer having the same conductivity type as said first layer over the metallic layer so as to epitaxially grow a second monocrystalline silicon layer of the same crystal orientation as the first grown layer and applying a polycrystalline silicon layer of the remainder of the metallic layer, forming an opening through said polycrystalline silicon and attaching an ohmic contact to said metallic layer through said opening.

4. In a semiconductor device having alternate layers of monocrystalline semiconductor material and a thin material having metallic conduction, the combination of a first layer of monocrcystalline semiconductor material of one conductivity type, a non-conducting coating partially covering a surface of said layer, an epitaxially monocrystalline semiconductor material overlying part of said surface juxtaposed to said coating of the same crystal orientation and conductivity type as said first layer, a layer of metallic material overlying both said juxtaposed non-conducting coating and epitaxial monocrystalline semiconductor material whereby part of said metallic layer overlies the non-conducting coating and part of said metallic layer overlies the epitaxial semiconductor layer, a third monocrystalline semiconductor layer of the same conductivity type as said first layer overlying the metallic layer in an epitaxial relation to said epitaxial semiconductor layer, a second non-conductive coating overlying a part of the metallic layer, an opening in said second coating, and an ohmic electrical connection to said metallic layer through said opening and ohmic electrical connections to said first layer and said third layer of monocrystalline semiconductor material.

5. In a semiconductor device having alternate layers of monocrystalline silicon and a thin material having metallic conduction, the combination of a first layer of monocrystalline silicon, a non-conducting coating partially covering a surface of said layer, an epitaxial monocrystalline semiconductor layer of one conductivity type overlying part of said surface juxtaposed to said coating of the same crystal orientation as said first layer, a layer of metallic material overlying both said juxtaposed non-conducting coating and epitaxial monocrystalline silicon layer whereby part of said metallic layer overlies the non-conducting coating and part of said metallic layer overlies the epitaxial silicon layer, a third monocrystalline silicon layer of the same conductivity type overlying the metallic layer in an epitaxial relation to said epitaxial silicon layer, a second non-conducting coating overlying a part of the metallic layer, an opening in said second coating, and an ohmic electrical connection to said metallic layer through said opening and ohmic electrical connections to said first layer and said third layer of monocrystalline silicon.

6. In a semiconductor device having alternate layers of monocrystalline silicon and a thin material having metallic conduction, the combination of a first layer of monocrystalline silicon, a silicon oxide coating covering a surface of said layer, an epitaxial monocrystalline silicon layer of one conductivity type overlying part of said surface juxtaposed to said coating and of the same crystal orientation as said first layer, a layer of metallic material overlying both said juxtaposed silicon oxide coating and said epitaxial monocrystalline silicon layer whereby part of said metallic layer overlies the silicon oxide coating and part of said metallic layer overlies said epitaxial monocrystalline silicon layer, a silicon coating overlying the metallic layer consisting of epitaxial monocrystalline silicon of the same conductivity type over said epitaxial monocrystalline silicon layer and polycrystalline silicon over said silicon oxide, an opening in said polycrystalline silicon part and an ohmic electrical connection through said opening to said metallic layer and ohmic electrical connections to said first layer and said silicon coating.

References Cited

UNITED STATES PATENTS

| | | | |
|---|---|---|---|
| 3,121,809 | 2/1964 | Atalla | 307—88.5 |
| 3,265,542 | 9/1966 | Hirshon | 148—175 |
| 3,326,729 | 6/1967 | Sigler | 148—175 |

JOHN W. HUCKERT, *Primary Examiner.*

M. H. EDLOW, *Assistant Examiner.*